United States Patent [19]

Pino

[11] Patent Number: 5,026,021

[45] Date of Patent: Jun. 25, 1991

[54] FLUSH CONTROL ASSEMBLY FOR PRESSURE FLUSH VALVES

[76] Inventor: Wilton J. Pino, 922 Sharp Rd., Baton Rouge, La. 70815

[21] Appl. No.: 585,719

[22] Filed: Sep. 19, 1990

[51] Int. Cl.⁵ .................... F16K 31/145; F16K 35/00
[52] U.S. Cl. .......................................... 251/40; 4/415; 4/661; 4/DIG. 15; 251/94; 251/95; 251/114
[58] Field of Search ................. 4/415, 661, DIG. 15; 251/36, 39, 40, 47, 49, 51, 89, 94, 95, 114, 116

[56] References Cited

U.S. PATENT DOCUMENTS

| | | | |
|---|---|---|---|
| 1,114,398 | 10/1914 | Sloan | 251/40 |
| 1,573,092 | 2/1926 | Russell | 251/40 |
| 1,589,640 | 6/1926 | Gulick | 251/36 |
| 1,723,599 | 8/1929 | Bullock | 251/40 |
| 2,776,812 | 1/1957 | Colendar | 251/40 |
| 3,082,790 | 3/1963 | Whitney | 251/40 |
| 3,083,732 | 4/1963 | Becker | 251/40 |
| 3,656,499 | 4/1972 | Nelson et al. | 251/120 |
| 4,202,525 | 5/1980 | Gouaer et al. | 251/40 |
| 4,327,891 | 5/1982 | Allen et al. | 251/40 |
| 4,586,692 | 5/1986 | Stephens | 251/40 |

*Primary Examiner*—George L. Walton
*Attorney, Agent, or Firm*—William David Kiesel; Robert C. Tucker

[57] ABSTRACT

A flush control assembly for delaying the flush cycle of pressure flush valves for use on plumbing fixtures. The flush control assembly attaches to, and becomes an integral working part of the flush valve and contains a delaying means which is actuated by water pressure differentials in the flush valve.

16 Claims, 3 Drawing Sheets

FLUSH CONTROL ASSEMBLY FOR PRESSURE FLUSH VALVES

FIELD OF THE INVENTION

The present invention relates to an assembly for delaying the flush cycle of pressure flush valves used for toilet fixtures, particularly the so-called Sloan type flush valves.

BACKGROUND OF THE INVENTION

The interval between flushes of conventional pressure flush valves used for toilet fixtures, particularly the well-known Sloan type flush valve, is normally not controllable. That is, the valve can be actuated as rapidly as the valve can mechanically reseat itself. Because the valve can reseat itself relatively rapidly, the flush valve can be flushed with such repetition that the flushing is substantially constant. While flush valves on toilet fixtures in most installations are subject to only normal use, there are some installations where the flush valve is abused by persons who repeatedly flush the valve for substantial periods of time. It is highly desirable in those installations to have flush valves which cannot be flushed in rapid succession. For example, in installations in penal institutions and mental institutions, users often repeatedly flush toilet fixtures in such rapid succession that a substantially constant flow of water results. If this is multiplied by the number of toilet fixtures in any given institution, with a certain percentage of them being misused on any given day, one can imagine the substantial quantities of water which are wasted. This is especially troublesome during draught conditions and in areas of the country, such as in many areas of California, where water is always in short supply.

Consequently, there exist a need in the art for a means for controlling the flush cycle of pressure flush valves in order to prevent such misuse. The control assembly of the present invention can prevent this misuse by substantially lengthening the time interval between flush cycles, thus reducing the amount of water which can pass through the valve for any given period of time and to discourage unnecessary repeated flushing.

SUMMARY OF THE INVENTION

In accordance with the present invention, there is provided a fluid control assembly attachable to a pressure flush valve having:

a hollow body having an inlet connectable to a source of water under pressure, an outlet connectable to a plumbing fixture, and a connection port;

an upstanding barrel portion within said flush valve body having a main valve seat around the top end thereof;

a flexible diaphragm having a central opening therein surrounded by a main valve seating portion which diaphragm contains a by-pass valve to fill a portion of said body located above the diaphragm with water from said inlet and a detachable inner cover;

a cylindrical hollow guide member depending from said diaphragm and extending through said barrel portion;

a relief valve seatable across the diaphragm opening and having an operating stem depending through said guide member, which stem is also characterized as having a slidable sleeve attached to and extending downward therefrom;

an internal detachable cover member positioned above said relief valve and spaced therefrom, an actuating assembly connected to a connection port of the flush valve body, which assembly has an actuating means capable of contacting said slidable sleeve of said relief valve stem and tilting the relief valve and the diaphragm off their respective seats to permit water to flow through said flush valve, and by so doing causing the slidable sleeve to slide up the relief valve stem and out of contact range of said actuating means, thus allowing the relief valve and diaphragm to reseat, and a means for delaying the return of the slidable sleeve to its normally downward position, thereby preventing the flush valve from being actuated for a period of time after the relief valve and diaphragm reseat.

DETAILED DESCRIPTION OF THE INVENTION

Figure 1:
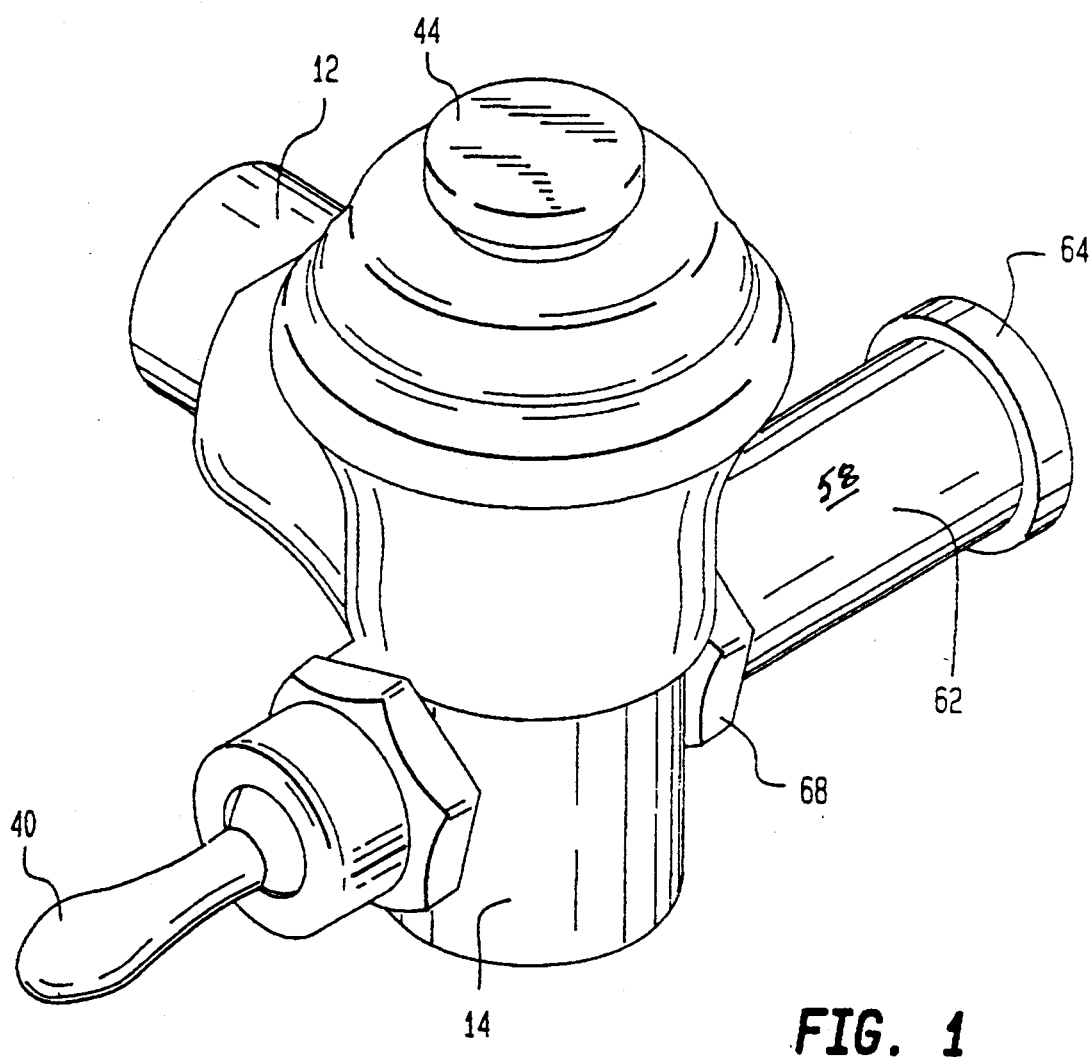
FIG. 1 is a perspective view of a pressure flush valve having the flush control assembly of the present invention attached thereto.

An overall view of the flush control assembly of the present invention is shown in FIG. 1 hereof in communication with a typical pressure flush valve, such as the well-known Sloan flush valve. Flush valves suitable for use with the assembly of the present invention are any pressure flush valve which operates in accordance with the principles of operation of the valve illustrated in FIG. 2 hereof. More particularly, those in which a slidable sleeve is attached to a relief valve stem to prevent the valve from continuously flushing when an actuating means, such as a plunger, remains in an actuating position. These parts will be described in detail in the discussion in FIG. 2. Returning now to FIG. 1, a pressure flush valve is shown having a body 10 provided with a cap 44, both preferably made of brass. There is also shown a inlet water supply connection 12, and an outlet 14 connectable to a plumbing fixture, such as a toilet or urinal. A handle 40 is also provided which is a member of an actuating assembly which is attached to a connection port and is used to actuate the flushing of the valve. The flush control assembly of the present invention 58 is shown connected on the opposite side of body 10 then the handle mechanism.

It is to be understood that the flush control assembly of the present invention need not necessarily be on the opposite side of the valve body than the handle mechanism. It can be placed anywhere on the body as long as it does not interfere with any intended function of the valve, including attachment of the water supply line and the performance of the intended purpose of the flush control assembly. One reason why it is preferred to have the control assembly attached to the opposite side of the body than the handle mechanism is because a substantial number of pressure flush valves are presently manufactured with two threaded connection ports, each on the opposite side of the body than the other, for attachment of a handle or actuating assembly. They are manufactured this way so that the flush valve can be installed for either right handed or left handed actuation.

Figure 2:
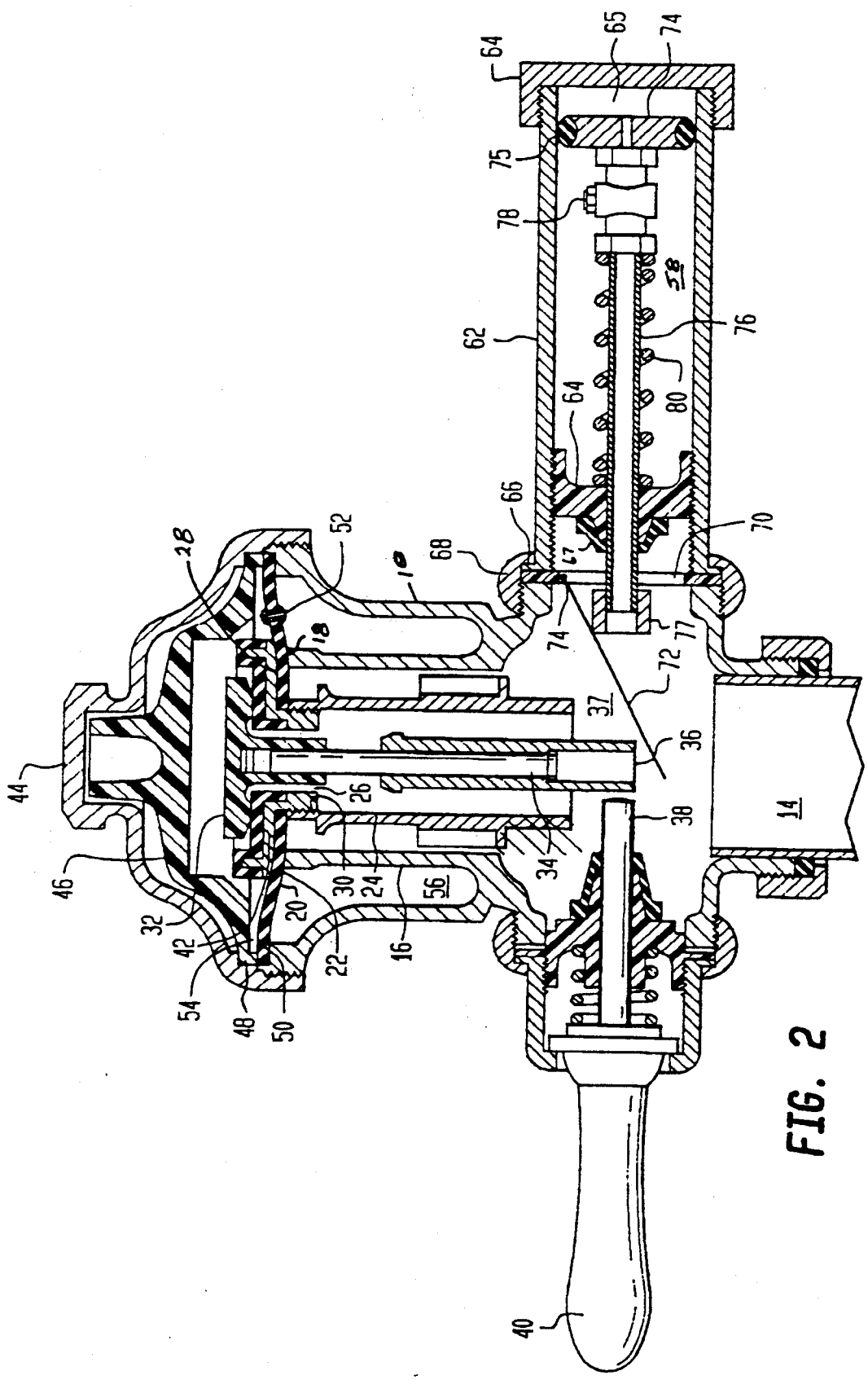
FIG. 2 is a cross-sectional view of a pressure flush valve showing connected thereto the flush control assembly of the present invention in a non-operating mode.

FIG. 2 hereof is a schematic illustration of the type of pressure flush valve which is suitable for use with the flush control assembly of the present invention. It is shown with the flush control assembly connected thereto. The flush valve includes a body 10 having an inlet water supply connection, hidden from view, and an outlet 14, between which there is an internal upstanding barrel 16. The upper edge portion of barrel 16 forms the annular main valve seat 18. The main valve member consists of a flexible circular diaphragm 20 made from an elastomeric material, such as rubber. The diaphragm has a bottom valve seating portion 22 which is clamped to the top end of a cylindrical hollow guide member 24, preferably made from a plastic material, which extends downward within the barrel 16. The diaphragm 20 is provided with a control opening 26 through which a clamping disc 28 extends with a portion 30 threaded into the guide member 24 thereby clamping the diaphragm between them. A more detailed description of the diaphragm can be found in U.S. Pat. No. 3,656,499 which is incorporated herein by reference. A relief valve 32, which is also preferably made from a plastic material, is carried by the clamping disc 28 and has a depending stem 34 which extends downward through the diaphragm opening and within guide member 24. A slidable sleeve 36, which is slidably attached to depending stem 34 and which is also preferably made from a plastic material, is arranged opposite the actuating means 38, or plunger, which is part of the actuating assembly and which is adapted to be pushed inward by handle 40 to contact the slidable sleeve and tilt the relief valve 32 off of its seat 42 across opening 26, to initiate a flushing cycle of the flush valve. It will be noted that a button mechanism can be used in place of handle 40 to actuate plunger 38. In fact, button mechanisms are usually preferred for installations in penal institutions, as well as in various public toilet facilities.

The valve body 10 is provided with an external cover, or cap, 44 and an internal detachable cover 46, the later preferably comprised of a plastic molding material, such as an acrylonitrile, butadiene, styrene (ABS) plastic. The external cover 44 is screw threaded around the top of the body 10 and is provided with a shoulder 48 which engages the outer peripheral edge of internal cover 46 and presses it downwardly against the thickened edge 50 of the diaphragm 20 to clamp the diaphragm firmly around its periphery into position in the valve body.

In the ordinary operation of the flush valve, the water pressures are equalized above and below the diaphragm 20 through the small by-pass opening 52, and since the pressure above the diaphragm in chamber 54 is greater than the pressure below the diaphragm in chamber 56, the diaphragm is held tightly against valve seat 18, thereby shutting off the water flow between the inlet, hidden from view, and outlet 14. When the valve is actuated, plunger 38 is pushed inward by operating handle 40 to contact slidable sleeve 36, thereby causing relief valve 32 to be tilted off its seat 42, so that the pressure above the diaphragm in chamber 54 is relieved downward through the diaphragm control opening 26 to the outlet 14. The water pressure from the inlet is now great enough to flex and lift the diaphragm off its seat 18 and permit water to flow through the flush valve and over the top end of barrel 16 to the outlet 14, and into the plumbing fixture.

In the event that the plunger is kept in an actuating position, continuous flushing is prevented by movement of the slidable sleeve up depending stem 34, thus allowing the relief valve and diaphragm to reseat and stop the water flow. With the relief valve reseated, upper chamber 54 gradually reaches the inlet pressure through by-pass opening 52, until diaphragm 20 is again seated on the main seat 18, shutting off the water flow, thereby fixing the length of the flushing cycle and the amount of water passing through the valve. When the handle is released, the plunger retracts to its normal position, thereby allowing slidable sleeve 36 to drop to its normal downward position opposite the plunger. The flush valve can again be flushed by actuating the plunger against slidable sleeve 36, which causes the relief valve to again be tilted from its seat, etc.

The flush control assembly 58 of the present invention is comprised of an elongated housing, preferably a relatively large bore cylindrical housing 62, closed at one end, preferably by use of a threaded end cap 64, thereby forming a chamber 65 between the end of the housing and piston 74, even when it is at its most retracted position. The other end of the control assembly, which is attachable to flush valve body 10, contains a sealing surface, such as a lip 66, for making a flush fit when the flush control assembly is attached to the body 10 by packing nut 68. Of course, the sealing surface need not butt up against the valve body. It may be any means suitable for providing a sealing connection of the control assembly with the valve body. One such suitable means can be an O-ring annularly disposed in a groove on the outside of housing 62. FIG. 2 shows a preferred embodiment wherein a sealing member 70, which can be of any suitable design and material, such as a washer or gasket, is used between the sealing surface 66 and the valve body to ensure a water tight seal. There is also provided a flap 72 at the attachable end of the housing 62. The flap can be pivotally attached to the sealing member, or to a metallic washer which can be used in combination with sealing member 20. It can be attached by any appropriate means, thus providing an integral assembly which can be easily installed for routine maintenance purposes. The flap may also be attached to the interior wall of the valve body 10 by pin 74 which is secured to the housing by any suitable means. Such suitable means includes welding, soldering, as well as providing holes, or grooves, for accepting the ends of the pin. Further, the pin may be a retractable pin somewhat like those used to hold watch bands onto the body of a wristwatch, but of course of the appropriate heavier duty construction. The flap can also be pivotally attached to a threaded inner tubular sleeve which can be screwed into the end of housing 62. This would also provide easy maintenance of the flush control assembly. The inner sleeve, containing the pivotally attached flap, can then be screwed into the attachable end of the housing.

Inside the housing 62 is a tubular assembly which is held in the housing in a position that is substantially parallel to the housing wall, by guide member 64, which contains a washer 67, and piston 74, which contains an O-ring 75. Guide member 64 can be of any suitable material, preferably plastics and metals. The tubular assembly is comprised of a relatively small bore tubular member 76 having the piston 74 attached at one end, a fluid control means 78, and a compression spring 80 for returning the tubular assembly to its normally retracted position. Piston 74 contains a hole through its thickness at its center to allow fluid communication between the chamber 65 and valve throat 37. The fluid control means may be any suitable means for controlling, or adjusting the flow of fluid through the tubular assembly and into and out of chamber 65. A preferred fluid control means is a needle valve. Piston 74 is in sealing contact with the interior walls of said housing 62, which seal is preferably ensured by use of a suitable sealing means, such as an O-ring 75.

Figure 3:
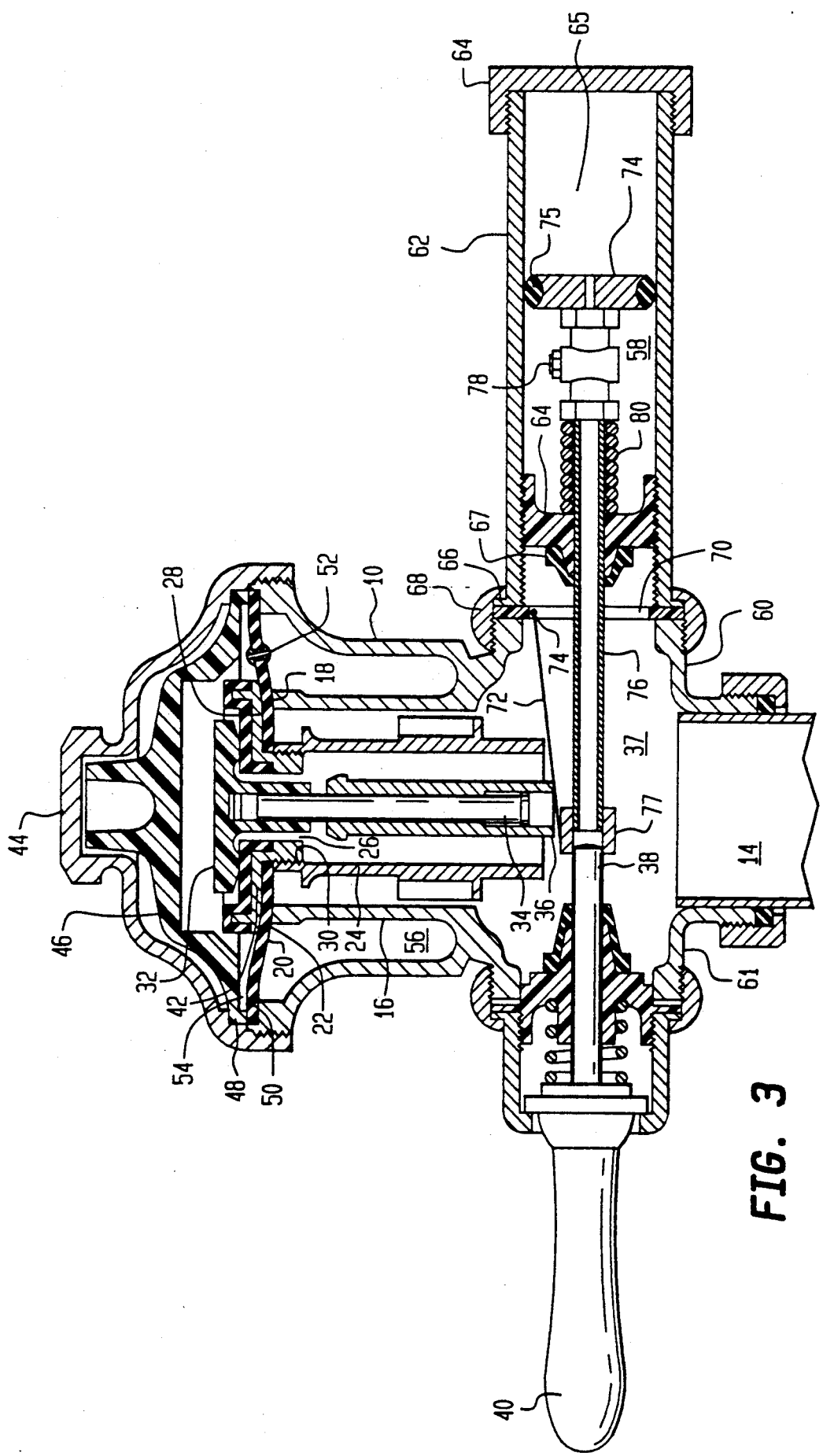
FIG. 3 is a cross-sectional view of the pressure flush valve of FIG. 2 but showing the flush control assembly of the present invention in operation.

Operation of the flush control assembly is shown in FIG. 3 hereof wherein flap 72 is engaged during flushing by the small bore tubular member 76. That is, when water is flowing through the flush valve and over the top end of barrel 16, the water pressure flowing through barrel 16 and past the end of tubular member 76 at valve throat 37, is greater than the pressure in chamber 65. Thus, water flows from the valve throat end of the tubular assembly into chamber 65. As the chamber fills with water and the pressure on the face of piston 74 overcomes the force of compression spring 80, the tubular assembly is extended into valve throat 37. In so doing, the front end of small bore tubular 76 having a larger bore tube 77 attached thereto pushes against and raises flap 72 which in turn engages slidable sleeve 36, thereby preventing it from returning to its normally downward position opposite plunger 38. The larger tube 77 at the end of small bore tubular 76 allows the tubular assembly to be extended further into valve throat 37 without being obstructed by plunger 38. After relief valve 32 and diaphragm 20 reseat, the pressure below the diaphragm, or at the end of the small bore tubular member 76, is less than the pressure in chamber 65, thereby causing water to flow from the chamber, through the tubular assembly and into the valve throat 37. The compression spring 80 then moves the tubular assembly to its normally retracted position, thus allowing flap 72 to disengage the slidable sleeve which then drops to its normally downward position. The flush valve can now be actuated again. The length of time the flap remains engaged to the slidable sleeve is controlled by the flow of water through the tubular assembly by adjusting the fluid control means, which is preferably an adjustable needle valve.

In a preferred mode of operation, it is desirable to extend the inner tubular mechanism as soon as possible, but to control its rate of retraction into the housing. This can be accomplished by use of a check valve in the fluid control means which allows water to readily flow through the tubular assembly toward chamber 65, but not the other way. In order for the water to flow from the chamber to the valve throat 37, it must pass through fluid control means in such a way that its flow rate is controlled to allow a controlled return of the tubular assembly into its retracted position. Thus, the return of the slidable sleeve to it normally downward position is controlled.

While particular embodiments of the invention have been described, it is well understood that the invention is not limited thereto since modifications may be made. For example, flap 72 need not be operated by the mechanical assembly described herein, but may be controlled by an electromechanical device in which actuation of the flush valve starts a timer, which controls the return of the flap for a predetermined period of time. Furthermore, it is understood that this invention is also contemplated to cover, by the appended claims, any such modifications which will fall within the spirit and scope of the claims.

What is claimed is:

1. A fluid control assembly connectable to a pressure flush valve having:
    a hollow body having an inlet connectable to a source of water under pressure, and an outlet connectable to a plumbing fixture, and a connection port;
    an upstanding barrel portion in said flush valve having a main valve seat around the top end thereof;
    a flexible diaphragm having a central opening therein surrounded by a main valve seating portion which diaphragm contains a by-pass valve to fill a portion of said body located above the diaphragm with water from said inlet and a detachable inner cover;
    a cylindrical hollow guide member depending from said diaphragm and extending through said barrel portion;
    a relief valve seatable across the diaphragm opening and having an operating stem depending downward through said guide member, which stem is also characterized as having a slidable sleeve attached to and extending downward therefrom;
    an internal detachable cover member positioned above said relief valve and spaced therefrom,
    an actuating assembly attached to a side of the body having an actuating means located within actuating distance of the slidable sleeve for actuating said pressure flush valve by contacting the slidable sleeve of the relief valve stem thereby tilting the relief valve and the diaphragm off of their seat and permitting water to flow through said flush valve, and by so doing causing the slidable sleeve to slide up the relief valve stem and out of contact with said actuating means, thus allowing the relief valve and diaphragm to reseat,
    wherein said fluid control assembly is comprised of a means actuated by the water pressure at the outlet of the flush valve for delaying the return of the slidable sleeve to its normally downward position for preventing the actuating means from actuating the relief valve stem for a pre-determined period of time after the relief valve and the diaphragm reseat.

2. The fluid control assembly of claim 1 which is comprised of:
    (i) an elongated housing having a closed end and another end connectable to a pressure flush valve;
    (ii) a tubular assembly which sealingly fits inside of said housing, said tubular assembly comprised of a relatively small bore tube in fluid communication and connected to a fluid control means, which in turn is in fluid communication with a piston for making sealing contact with the interior wall of the housing, which tubular assembly also contains a spring for returning the tubular assembly to a retractable position inside of the housing.

3. The fluid control assembly of claim 2 wherein the means for delaying the return of the slidable sleeve is secured to said elongated housing at the connectable end and is actuated by the tubular assembly extending outward from said elongated housing.

4. The fluid control assembly of claim 3 wherein the means for delaying the return of the slidable sleeve is a flap and the elongated body is cylindrical in shape.

5. The fluid control assembly of claim 3 wherein the means for delaying the return of the slidable sleeve is attached to a washer, or ring, which is fastened between the flush control assembly and the body of the flush valve.

6. The flush control assembly of claim 4 wherein the flap is attached directly to the cylindrical housing.

7. The flush control assembly of claim 2 wherein the fluid control means contains a check valve for allowing easy passage of water into the flush control assembly but not out, and a needle valve for controlling the rate of flow of water out of the assembly.

8. The flush control assembly of claim 7 wherein the elongated housing is cylindrical in shape and the means for delaying the return of the slidable sleeve is secured to said housing at its connectable end, and is actuated by the tubular assembly extending outward from said housing.

9. The flush control assembly of claim 8 wherein the means for delaying the return of the slidable sleeve is attached to a washer which is fastened between the flush control assembly and the body of the flush valve.

10. The flush control assembly of claim 1 in which the means for delaying the return of the slidable sleeve is controlled by an electromechanical means.

11. The flush control assembly of claim 2 wherein the fluid control means allows easy passage of water into the flush control assembly, but not out, and controls the passage of water out of the assembly.

12. A pressure flush valve having:

a hollow body having an inlet connectable to a source of water under pressure, and an outlet connectable to a plumbing fixture, and a connection port;

an upstanding barrel portion in said flush valve having a main valve seat around the top end thereof;

a flexible diaphragm having a central opening therein surrounded by a main valve seating portion which diaphragm contains a by-pass valve to fill a portion of said body located above the diaphragm with water from said inlet and a detachable inner cover;

a cylindrical hollow guide member depending from said diaphragm and extending through said barrel portion;

a relief valve seatable across the diaphragm opening and having an operating stem depending downward through said guide member, which stem is also characterized as having a slidable sleeve attached to and extending downward therefrom;

an internal detachable cover member positioned above said relief valve and spaced therefrom;

an actuating assembly attached to a side of the body having an actuating means located within actuating distance of the slidable sleeve for actuating said pressure flush valve by contacting the slidable sleeve of the relief valve stem thereby tilting the relief valve and the diaphragm off of their seat and permitting water to flow through said flush valve, and by so doing causing the slidable sleeve to slide up the relief valve stem and out of contact with said actuating means, thus allowing the relief valve and diaphragm to reseat, and a fluid control assembly comprised of a means actuated by the water pressure at the outlet of the flush valve for delaying the return of the slidable sleeve to its normally downward position for preventing the actuating means from actuating the relief valve stem for a pre-determined period of time after the relief valve and the diaphragm reseat.

13. The flush valve of claim 12 wherein the means for delaying the return of the slidable sleeve is part of the fluid control assembly comprising:

(i) an elongated housing having a closed end and another end connectable to a pressure flush valve;

(ii) a tubular assembly which sealingly fits inside of said housing, said tubular assembly comprised of a relatively small bore tube in fluid communication and connected to a fluid control means, which in turn is in fluid communication with a piston for making sealing contact with the interior wall of the housing, which tubular assembly also contains a spring for returning the tubular assembly to a retractable position inside of the housing.

14. The flush valve of claim 13 wherein the elongated housing is cylindrical in shape and the means for delaying the return of the slidable sleeve is secured to said housing at its connectable end, and is actuated by the tubular assembly extending outward from said housing.

15. The flush valve of claim 14 wherein the means for delaying the return of the slidable sleeve is attached to a washer, or ring, which is fastened between the flush control assembly and the body of the flush valve.

16. The flush valve of claim 10 in which the means for delaying the return of the slidable sleeve is controlled by an electromechanical means.

* * * * *